US 9,879,921 B2

(12) United States Patent
Lee et al.

(10) Patent No.: US 9,879,921 B2
(45) Date of Patent: Jan. 30, 2018

(54) HEAT EXCHANGER AND REFRIGERATION CYCLE DEVICE INCLUDING THE HEAT EXCHANGER

(75) Inventors: Sangmu Lee, Tokyo (JP); Mitsuhiro Ishikawa, Tokyo (JP); Akira Ishibashi, Tokyo (JP); Takuya Matsuda, Tokyo (JP)

(73) Assignee: MITSUBISHI CORPORATION, Tokyo (JP)

( * ) Notice: Subject to any disclaimer, the term of this patent is extended or adjusted under 35 U.S.C. 154(b) by 749 days.

(21) Appl. No.: 14/241,479

(22) PCT Filed: Jan. 30, 2012

(86) PCT No.: PCT/JP2012/000577
§ 371 (c)(1),
(2), (4) Date: Feb. 27, 2014

(87) PCT Pub. No.: WO2013/046482
PCT Pub. Date: Apr. 4, 2013

(65) Prior Publication Data
US 2014/0223956 A1    Aug. 14, 2014

(30) Foreign Application Priority Data

Sep. 26, 2011  (JP) ................. 2011-209165

(51) Int. Cl.
*F28F 1/42* (2006.01)
*F28F 1/14* (2006.01)
(Continued)

(52) U.S. Cl.
CPC ............... *F28F 1/14* (2013.01); *F25B 39/00* (2013.01); *F28D 1/0477* (2013.01); *F28F 1/32* (2013.01);
(Continued)

(58) Field of Classification Search
CPC ........ F28F 1/40; F28F 1/42; F28F 1/14; F28F 2275/125
See application file for complete search history.

(56) References Cited

U.S. PATENT DOCUMENTS 6,173,763 B1 * 1/2001 Sano .................. F28F 1/32
165/133
2002/0195233 A1  12/2002 Thors et al.
(Continued)

FOREIGN PATENT DOCUMENTS

CN  102112838 A   6/2011
JP   54-147751 U  4/1978
(Continued)

OTHER PUBLICATIONS

Office Action dated Nov. 5, 2015 in the corresponding CN application No. 201280046842.X (with English translation).
(Continued)

*Primary Examiner* — Len Tran
*Assistant Examiner* — Jon T Schermerhorn
(74) *Attorney, Agent, or Firm* — Posz Law Group, PLC (57) ABSTRACT

A heat exchanger includes fins that are arranged in a direction orthogonal to a direction in which air flows and a heat transfer pipe that extends through the fins and that is bonded and fixed to the fins when the heat transfer pipe is radially expanded by a pipe-expanding method. Tall projections and short projections are provided on an inner surface of the heat transfer pipe. The tall projections are arranged in a circumferential direction and extend in an axial direction of the heat transfer pipe. The short projections are arranged between the tall projections and extend in the axial direction. Opposing side surfaces of the tall and short projections after the expansion of the heat transfer pipe are so inclined that when extensions are drawn from the side surfaces, the
(Continued)

extensions cross each other in an inner region of the heat transfer pipe.

16 Claims, 5 Drawing Sheets

(51) Int. Cl.
| | | |
|---|---|---|
| *F28F 1/40* | (2006.01) | |
| *F25B 39/00* | (2006.01) | |
| *F28F 1/32* | (2006.01) | |
| *F28D 1/047* | (2006.01) | |
| *F28D 21/00* | (2006.01) | |
| *F25B 13/00* | (2006.01) | |
| *F25B 49/02* | (2006.01) | |

(52) U.S. Cl.
CPC ............... *F28F 1/40* (2013.01); *F25B 13/00* (2013.01); *F25B 49/02* (2013.01); *F25B 2400/13* (2013.01); *F25B 2600/021* (2013.01); *F25B 2600/07* (2013.01); *F28D 2021/0068* (2013.01); *F28F 2275/125* (2013.01); *Y02B 30/741* (2013.01)

(56) References Cited

U.S. PATENT DOCUMENTS

| | | | |
|---|---|---|---|
| 2005/0126757 A1* | 6/2005 | Bennett | F28F 1/40 165/104.11 |
| 2005/0188538 A1* | 9/2005 | Kondo | B21D 53/085 29/890.044 |
| 2007/0089868 A1 | 4/2007 | Houfuku et al. | |
| 2011/0113820 A1 | 5/2011 | Lee et al. | |

FOREIGN PATENT DOCUMENTS

| | | | |
|---|---|---|---|
| JP | 63-172893 | A | 7/1988 |
| JP | 63-290395 | A | 11/1988 |
| JP | 63290395 | A * | 11/1988 |
| JP | H03-133514 | A | 6/1991 |
| JP | 2000-121272 | A | 4/2000 |
| JP | 2001-289585 | A | 10/2001 |
| JP | 2002-081882 | A | 3/2002 |
| JP | 2005-257160 | A | 9/2005 |
| WO | 2009/131072 | A1 | 10/2009 |

OTHER PUBLICATIONS

Office Action dated May 25, 2015 in corresponding CN patent application No. 201280046842.X (and English translation).
Extended European Search Report dated Jun. 9, 2015 issued in corresponding EP patent application No. 12835922.1.
Office Action dated Feb. 3, 2015 in corresponding JP application No. 2013-535815 (with English translation).
International Search Report of the International Searching Authority dated Mar. 19, 2012 for the corresponding international application No. PCT/JP2012/000577 (and English translation).

* cited by examiner

HEAT EXCHANGER AND REFRIGERATION CYCLE DEVICE INCLUDING THE HEAT EXCHANGER

CROSS REFERENCE TO RELATED APPLICATIONS

This application is a U.S. national stage application of PCT/JP2012/000577 filed on Jan. 30, 2012, and is based on Japanese Patent Application No. 2011-209165 filed on Sep. 26, 2011, the contents of which are incorporated herein by reference.

TECHNICAL FIELD

The present invention relates to a heat exchanger including a heat transfer pipe having grooves on an inner surface thereof, and also relates to a refrigeration cycle device including the heat exchanger.

BACKGROUND

Heat exchangers included in refrigerating devices, air conditioning devices, heat pumps, etc., generally include fins that are arranged with predetermined intervals therebetween and a heat transfer pipe secured such that the heat transfer pipe extends through each fin. The heat transfer pipe serves as a part of a refrigerant circuit in a refrigeration cycle device and allows refrigerant (fluid) to flow therethrough.

Grooves are formed on an inner surface of the heat transfer pipe so that a plurality of groove portions and a plurality of projections extend in a circumferential direction and an axial direction of the heat transfer pipe 20. The refrigerant that flows through the heat transfer pipe undergoes a phase change (condensation or evaporation) as a result of heat exchange with air or the like outside the heat transfer pipe. To increase the efficiency of the phase change, the heat transfer performance of the heat transfer pipe has been improved by, for example, increasing the surface area inside the pipe or utilizing a fluid agitation effect provided by the groove portions or an effect of holding a liquid film between the groove portions provided by capillary action of the groove portions (see, for example, Patent Literature 1).

PATENT LITERATURE

Patent Literature 1: Japanese Unexamined Patent Application Publication No. 2001-289585 (Abstract, FIG. 1)

The above-described heat transfer pipe according to the related art is made of a metal of aluminum or an aluminum alloy. The heat exchanger is manufactured by a mechanical pipe-expanding method in which a pipe-expanding ball is pushed into the pipe to expand the heat transfer pipe from the inside so that the heat transfer pipe comes into close contact with the fins and is bonded to the fins. However, when the heat transfer pipe is expanded, tall projections are crushed by the pipe-expanding ball, and the adhesion between the heat transfer pipe and the fins is reduced. In addition, there is a problem that a reduction in height of the tall projections causes a reduction in condensation/evaporation heat transfer performance in the pipe.

In addition, since the aluminum material has a low strength, it is necessary that the bottom of the grooves in the heat transfer pipe have a large plate thickness. Therefore, there is a problem that pressure loss in the heat transfer pipe increases.

SUMMARY

The present invention has been made to solve the above-described problems, and a first object of the present invention is to provide a heat exchanger capable of improving the heat transfer performance without increasing the pressure loss in the pipe and a refrigeration cycle device including the heat exchanger.

A second object is to provide a heat exchanger capable of increasing the adhesion between a heat transfer pipe and fins and a refrigeration cycle device including the heat exchanger.

A heat exchanger according to the present invention includes fins that are arranged in a direction orthogonal to a direction in which air flows and a heat transfer pipe that extends through the fins and that is bonded and fixed to the fins when the heat transfer pipe is radially expanded by a pipe-expanding method. First projections and second projections are provided on an inner surface of the heat transfer pipe, the first projections being arranged in a circumferential direction and extending in an axial direction of the heat transfer pipe, and the second projections being arranged between the first projections, extending in the axial direction, and having a height smaller than a height of the first projections. After the expansion of the heat transfer pipe, the height of the first projections is greater than or equal to the height of the second projections and a width of a tip portion of each first projection is greater than a width of a base portion of the first projection. Opposing side surfaces of the first and second projections after the expansion of the heat transfer pipe are so inclined that when extensions are drawn from the side surfaces, the extensions cross each other in an inner region of the heat transfer pipe.

According to the present invention, when the heat transfer pipe is radially expanded by the pipe-expanding method, the height of the first projections is greater than or equal to that the second projections, and the width of the tip portion of each first projection is greater than the width of the base portion of the first projection. In addition, the opposed side surfaces of the first and second projections after the expansion of the heat transfer pipe are inclined such that the extensions of the side surfaces cross each other in the inner region of the heat transfer pipe. Accordingly, the condensation/evaporation heat transfer performance in the pipe can be made higher than that in a heat transfer pipe according to the related art without increasing the pressure loss in the pipe. Therefore, a high-efficiency heat exchanger can be provided.

DETAILED DESCRIPTION

Embodiment 1

Figure 1:
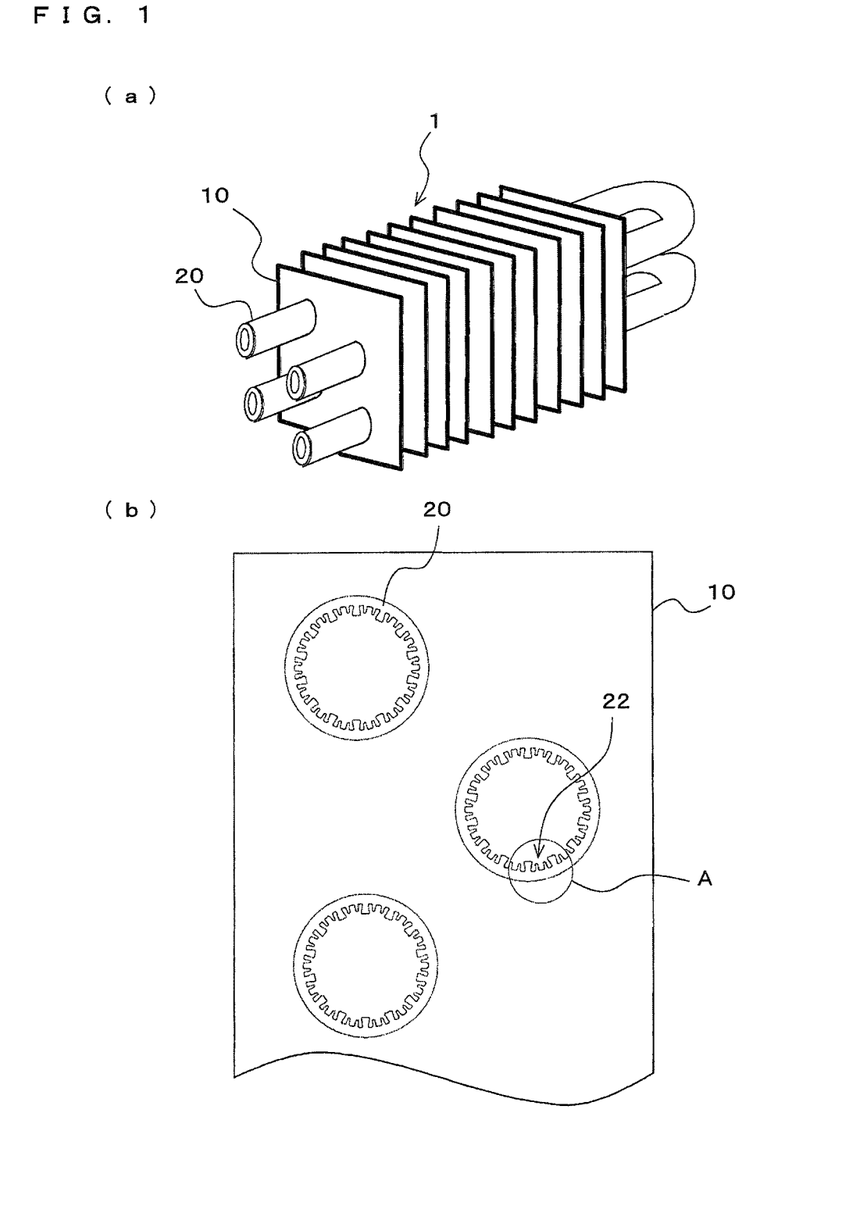
FIG. 1 shows a perspective view of a heat exchanger according to Embodiment 1 and an enlarged sectional view of a heat transfer pipe included in the heat exchanger.

FIG. 1 shows a perspective view of a heat exchanger according to Embodiment 1 and an enlarged sectional view of a heat transfer pipe included in the heat exchanger. In this figure, part (a) is a perspective view illustrating the external appearance of the heat exchanger, and part (b) is an enlarged sectional view of the heat transfer pipe included in the heat exchanger.

Referring to FIG. 1(*a*), a heat exchanger 1 is an example of fin-tube heat exchangers which are in widespread use as evaporators and condensers of, for example, refrigerating devices and air conditioning devices. The heat exchanger 1 includes fins 10 arranged in a direction orthogonal to a direction in which air flows and a heat transfer pipe 20 that has, for example, a round shape and that is secured such that the heat transfer pipe 20 extends through each fin 10. The fins 10 are made of, for example, an aluminum material having a low deformation resistance, and the heat transfer pipe 20 is made of, for example, an aluminum material having a deformation resistance higher than that of the aluminum material of the fins 10.

The heat transfer pipe 20 is a component of a refrigerant circuit of a refrigeration cycle device. As described below, the heat transfer pipe 20 has a plurality of projections 22 (see FIG. 1(*b*)) that project toward the axial center on an inner surface thereof, and allows refrigerant to flow therethrough. The refrigerant that flows through the heat transfer pipe 20 and the air that flows outside the heat transfer pipe 20 exchange heat through the fins 10, so that the heat transfer area, which is the area of a surface that contacts the air, is increased and heat can be efficiently exchanged between the refrigerant and the air.

Figure 2:
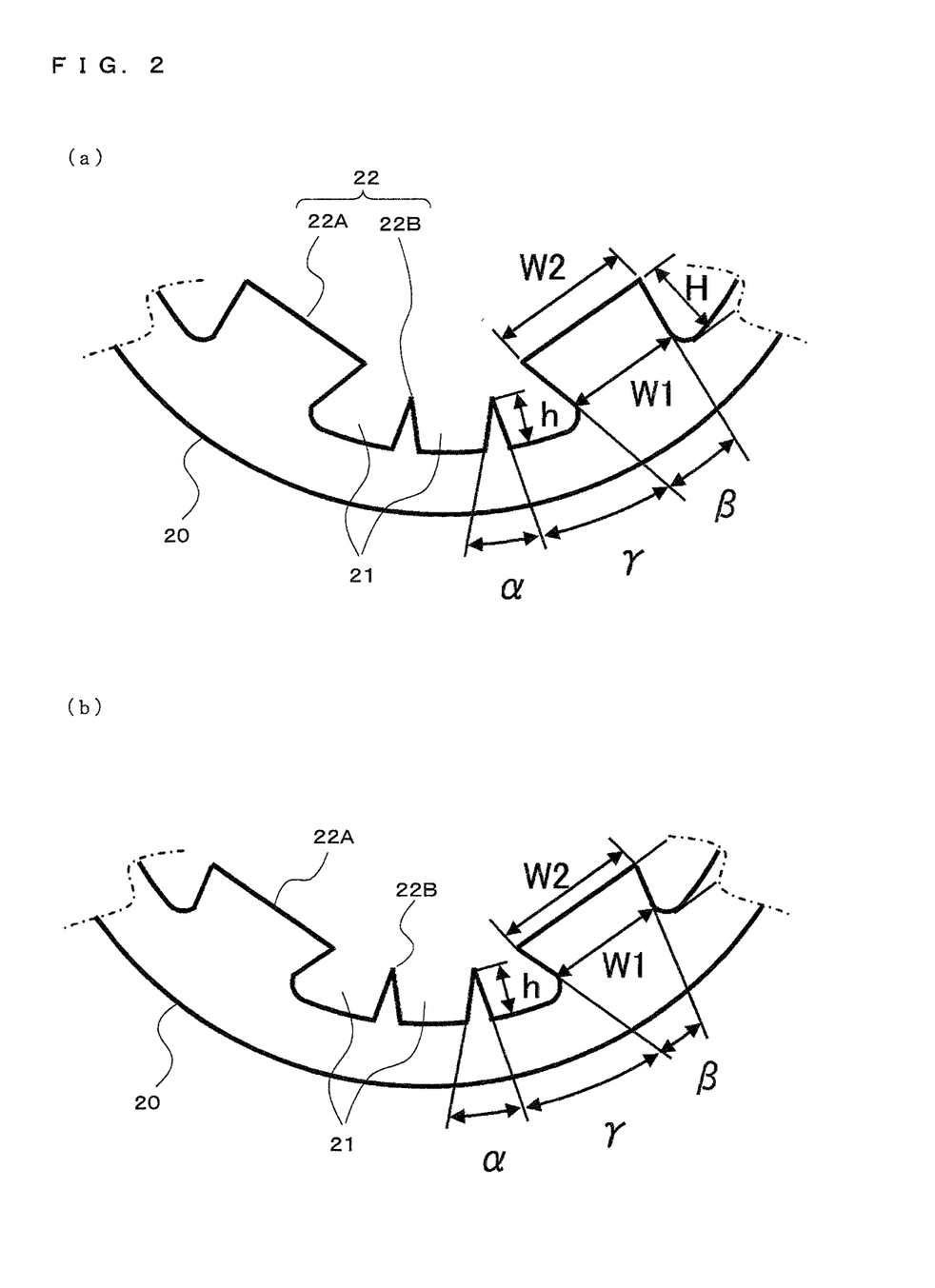
FIG. 2 shows enlarged partial sectional views of part A of the heat transfer pipe illustrated in FIG. 1.

FIG. 2 shows enlarged partial sectional views of part A of the heat transfer pipe illustrated in FIG. 1. In this figure, part (a) illustrates the state before expansion of the heat transfer pipe 20, and part (b) illustrates the state after the expansion of the heat transfer pipe 20.

In Embodiment 1, grooves are formed on the inner surface of the heat transfer pipe 20 so that a plurality of groove portions 21 and the plurality of projections 22 that extend in an axial direction of the heat transfer pipe 20 are arranged in a circumferential direction, as illustrated in FIG. 2(*a*). The projections 22 project toward the axial center of the heat transfer pipe 20, as described above. The projections 22 include two types of projections which are, for example, first projections 22A having flat tip portions (hereinafter referred to as "tall projections 22A") and second projections 22B having pointed tip portions (hereinafter referred to as "short projections 22B").

The height h of the short projections 22B is smaller than the height H of the tall projections 22A by, for example, 0.06 mm or more before the expansion of the heat transfer pipe 20. When the difference (H−h) between the tall projections 22A and the short projections 22B is excessively large or when the short projections 22B are excessively short, there is a possibility that the heat transfer performance will be reduced owing to, for example, a reduction in surface area inside the heat transfer pipe 20. Therefore, in Embodiment 1, the difference is set so as to be close to 0.06 mm. This dimension is an example and is not limitative. The dimension differs depending on the outer diameter of the heat transfer pipe 20.

Each tall projection 22A has the shape of an inverted trapezoid in which the width W2 of a tip portion is greater than the width W1 of a base portion. Each short projection 22B has a triangular shape such that the distance between both side surfaces thereof decreases from a base portion toward a tip portion.

Figure 3:
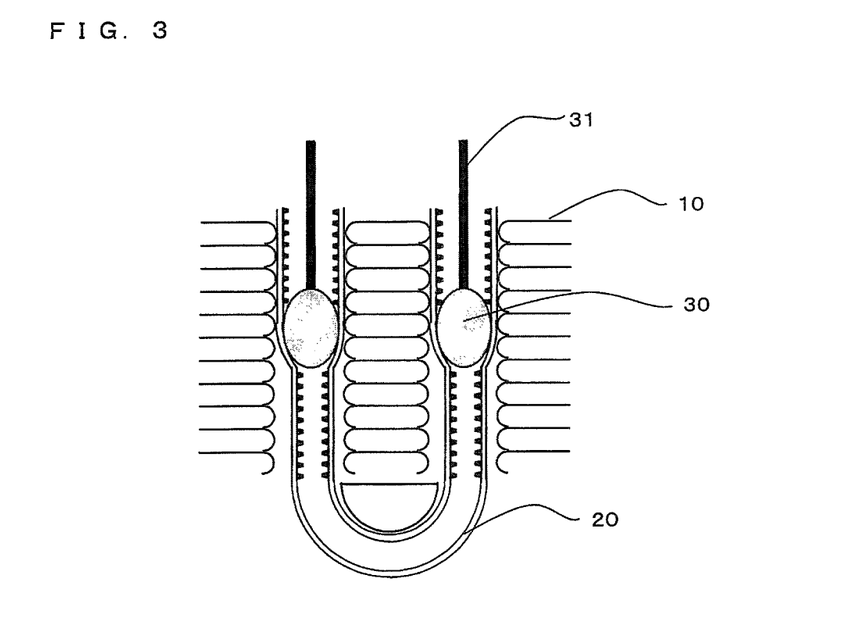
FIG. 3 is a sectional view illustrating how the heat transfer pipe is expanded by a mechanical pipe-expanding method.

FIG. 3 is a sectional view illustrating how the heat transfer pipe is expanded by a mechanical pipe-expanding method.

The heat transfer pipe 20 according to Embodiment 1 is manufactured as follows. That is, first, a plurality of hairpin tubes used to form the heat transfer pipe 20 are manufactured by bending the tubes at central regions thereof in a longitudinal direction (axial direction) at a predetermined bending pitch into a hairpin shape. The hairpin tubes are inserted into through holes formed in each fin 10, and are then expanded by the mechanical pipe-expanding method to form the heat transfer pipe 20. Thus, the heat transfer pipe 20 is brought into close contact with and bonded to each fin 10. The above-described mechanical pipe-expanding method is a method in which a rod 31 having a pipe-expanding ball 30 at an end thereof is inserted into the heat transfer pipe 20, the pipe-expanding ball 30 having a diameter slightly larger than the inner diameter of the heat transfer pipe 20. Accordingly, the outer diameter of the heat transfer pipe 20 is increased, so that the heat transfer pipe 20 comes into close contact with each fin 10. A hydraulic pipe-expanding method, in which the heat transfer pipe 20 is expanded by pushing the pipe-expanding ball 30 into the pipe by fluid pressure, may be used instead of the mechanical pipe-expanding method.

Each tall projection 22A has the shape of an inverted trapezoid in which the width W2 of the tip portion is greater than the width W1 of the base portion. Therefore, when the pipe is expanded by the mechanical pipe-expanding method, the contact area between the pipe-expanding ball 30 and each tall projection 22A is large. The tip portions of the tall projections 22A are depressed by approximately 0.06 mm and flattened, and the height H of the tall projections 22A is reduced. At this time, an apex angle β, which is a crossing angle between both side surfaces of each tall projection 22A, becomes smaller than that before the expansion of the heat transfer pipe 20.

The height h of the short projections 22B is smaller than the amount of depression 0.06 mm, so that the short projections 22B are not deformed. In Embodiment 1, unlike the case of the related art in which the insertion pressure of the pipe-expanding ball 30 is applied to all of the projections 22 in the pipe, the pipe is expanded while the pressure is applied to the tip portions of the tall projections 22A. Therefore, the outer surface of the heat transfer pipe 20 having a round shape is formed into a polygonal shape. Accordingly, springback of the heat transfer pipe 20 can be suppressed and the adhesion between the heat transfer pipe 20 and each fin 10 can be improved, so that the heat exchange efficiency can be increased.

The opposed side surfaces of the tall and short projections 22A and 22B after the expansion of the heat transfer pipe 20 are inclined such that the extensions of the side surfaces cross each other in an inner region of the heat transfer pipe 20. The crossing angle (apex angle γ) between the extensions of the side surfaces is in the range of, for example, 2 degrees to 12 degrees. The apex angle γ after the expansion of the heat transfer pipe 20 is greater than the apex angle γ before the expansion. Although the above-described apex angle γ is set in the range of, for example, 2 degrees to 12 degrees, this differs in accordance with the outer diameter of the heat transfer pipe 20, and is not limited.

Figure 4:
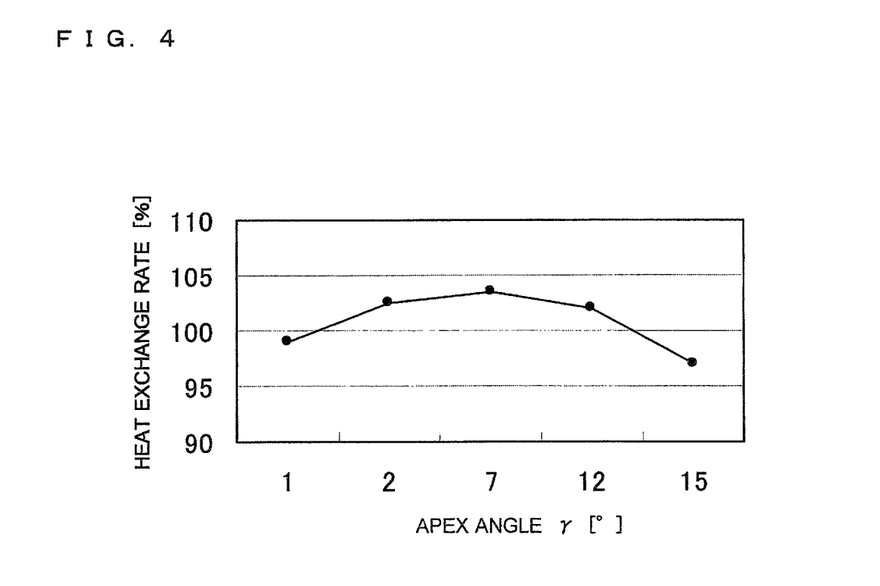
FIG. 4 is a graph showing the relationship between apex angle γ and heat exchange rate, the apex angle γ being a crossing angle between opposed side surfaces of tall and short projections after the expansion of the pipe.

FIG. 4 is a graph showing the relationship between the apex angle γ, which is the crossing angle between the opposed side surfaces of the tall and short projections after the expansion of the pipe, and the heat exchange rate.

On the inner surface of the heat transfer pipe 20, as described above, the apex angle γ, which is the crossing angle between the opposed side surfaces of the tall and short projections 22A and 22B after the expansion of the pipe, is in the range of, for example, 2 degrees to 12 degrees (in a predetermined angular range).

The reason why the apex angle γ, which is the crossing angle between the opposed side surfaces of the tall and short projections 22A and 22B after the expansion of the heat transfer pipe 20, is set in the range of 2 degrees to 12 degrees in the heat exchanger 1 will now be described. When the heat transfer pipe 20 is expanded, the pipe-expanding ball 30 contacts the tall projections 22A so that the tip portions of the tall projections 22A are depressed by 0.06 mm and the height H of each projection is reduced. Here, if the above-described apex angle γ is less than 2 degrees, boiling prompting effect cannot be achieved and evaporation heat transfer performance in the pipe is reduced.

If the apex angle γ, which is the crossing angle between the opposed side surfaces of the tall and short projections 22A and 22B after the expansion of the pipe, is greater than 12 degrees, the refrigerant cannot easily flow into the spaces between the tall projections 22A and the short projections 22B, and condensation/evaporation heat transfer performance in the pipe is reduced.

As described above, according to Embodiment 1, the difference between the height H of the tall projections 22A included in the heat transfer pipe 20 and the height h of the short projections 22B included in the heat transfer pipe 20 is 0.06 mm of more. In addition, each tall projection 22A has the shape of an inverted trapezoid in which the width W2 of the tip portion is greater than the width W1 of the base portion, and each short projection 22B has a triangular shape. After the heat transfer pipe 20 is expanded by the mechanical pipe-expanding method, the apex angle γ, which is the crossing angle between the opposed side surfaces of the tall and short projections 22A and 22B, is in the range of 2 degrees to 12 degrees. Accordingly, the heat transfer performance of the heat transfer pipe 20 can be increased. In addition, since the pipe-expanding ball 30 contacts only the tip portions of the tall projections 22A to expand the pipe, the outer surface of the heat transfer pipe 20 is formed into a polygonal shape and springback of the heat transfer pipe 20 can be suppressed. Accordingly, the adhesion between the heat transfer pipe 20 and the fins 10 can be improved and the heat exchange rate (ratio between heat quantities before and after passage through the heat transfer pipe) can be increased, so that energy consumption can be reduced. In addition, the amount of refrigerant in the refrigerant circuit can be reduced, and size reduction can be achieved while maintaining high efficiency.

In Embodiment 1, in the heat transfer pipe 20 after the expansion, the apex angle γ, which is the crossing angle between the opposed side surfaces of the tall and short projections 22A and 22B, is set in the range of 2 degrees to 12 degrees. However, the range of the apex angle γ is not limited. For example, the above-described apex angle γ may be in the range of 3 degrees to 10 degrees. When the apex angle γ is set in the range of 3 degrees to 10 degrees, the evaporation heat transfer performance can be made higher than that in the heat transfer pipe 20 in which the apex angle γ is in the range of 2 degrees to 12 degrees.

Embodiment 2

In Embodiment 2, referring to FIG. 2(b), the width W2 of the tip portion of each tall projection 22A after the expansion of the heat transfer pipe 20 is in the range of 0.28 mm to 0.46 mm, and the ratio W2/W1 of the width W2 of the tip portion to the width W1 of the base portion is in the range of, for example, 1.15 to 1.92. In addition, an apex angle α, which is a crossing angle between both side surfaces of each short projection 22B after the expansion of the heat transfer pipe 20, is in the range of, for example, 5 degrees to 15 degrees.

When each tall projection 22A is formed such that the ratio W2/W1 of the width W2 of the tip portion to the width W1 of the base portion after the expansion of the heat transfer pipe 20 is in the range of 1.15 to 1.92, the refrigerant easily flows into the spaces between the tip portions of the tall projections 22A and the tip portions of the short projections 22B. As a result, the boiling prompting effect can be achieved and the evaporation heat transfer performance in the pipe is increased.

However, when the ratio W2/W1 of the width W2 of the tip portion to the width W1 of the base portion is smaller than 1.15, the boiling prompting effect cannot be achieved and the evaporation heat transfer performance in the pipe is reduced. When the ratio W2/W1 is greater than 1.92, the refrigerant cannot easily flow into the grooves 21 (spaces) between the tall projections 22A and the short projections 22B, and the evaporation heat transfer performance in the pipe is reduced.

In Embodiment 2, as described above, the tall projections 22A before the expansion of the heat transfer pipe 20 are formed so that the ratio W2/W1 of the width W2 of the tip portion to the width W1 of the base portion after the expansion of the heat transfer pipe 20 is in the range of 1.15 to 1.92 and the width W2 of the tip portion of each tall projection 22A after the expansion of the heat transfer pipe 20 is in the range of 0.28 mm to 0.46 mm. Thus, the evaporation heat transfer performance after the expansion of the heat transfer pipe 20 can be further increased.

The apex angle α, which is the crossing angle between both side surfaces of each short projection 22B, is in the range of 5 degrees to 15 degrees after the expansion of the heat transfer pipe 20. Accordingly, the thickness of refrigerant condensate films formed in the groove portions 21 on both sides of each short projection 22B is reduced, and the condensation heat transfer performance in the pipe is increased.

When the apex angle α, which is the crossing angle between both side surfaces of each short projection 22B, is smaller than 5 degrees, the thickness of the refrigerant condensate films is increased and the condensation heat transfer performance in the pipe is reduced. When the apex angle α is greater than 15 degrees, the heat transfer area of the groove portions 21 between the tall projections 22A and the short projections 22B is reduced, and the condensation/evaporation heat transfer performance in the pipe is reduced.

In Embodiment 2, the short projections 22B before the expansion of the heat transfer pipe 20 are formed so that the apex angle α, which is the crossing angle between both side surfaces of each short projection 22B after the expansion of the heat transfer pipe 20, is in the range of 5 degrees to 15 degrees. The apex angle α of each short projection 22B is in the range of 5 degrees to 15 degrees because the diameter of the heat transfer pipe 20 is increased as a result of the expansion of the heat transfer pipe 20 (see FIGS. 2(a) and 2(b)).

As described above, according to Embodiment 2, the tall projections 22A and the short projections 22B are formed so that the width W2 of the tip portion of each tall projection 22A after the expansion of the heat transfer pipe 20 is in the range of 0.28 mm to 0.46 mm, that the ratio W2/W1 of the width W2 of the tip portion to the width W1 of the base portion is in the range of 1.15 to 1.92, and that the apex angle α, which is the crossing angle between both side surfaces of each short projection 22B, is in the range of 5 degrees to 15 degrees after the expansion of the heat transfer pipe 20. Accordingly, the heat transfer performance of the heat transfer pipe 20 can be increased.

In Embodiment 2, the width W2 of the tip portion of each tall projection 22A after the expansion of the heat transfer pipe 20 is in the range of 0.28 mm to 0.46 mm, the ratio W2/W1 of the width W2 of the tip portion to the width W1 of the base portion is in the range of 1.15 to 1.92, and the apex angle α, which is the crossing angle between both side surfaces of each short projection 22B after the expansion of the heat transfer pipe 20, is in the range of 5 degrees to 15 degrees. However, this differs in accordance with the outer diameter of the heat transfer pipe 20, and is not limited.

Embodiment 3

In Embodiment 3, the number of tall projections 22A provided on the inner surface of the heat transfer pipe 20 is in the range of, for example, 12 to 18.

Figure 5:
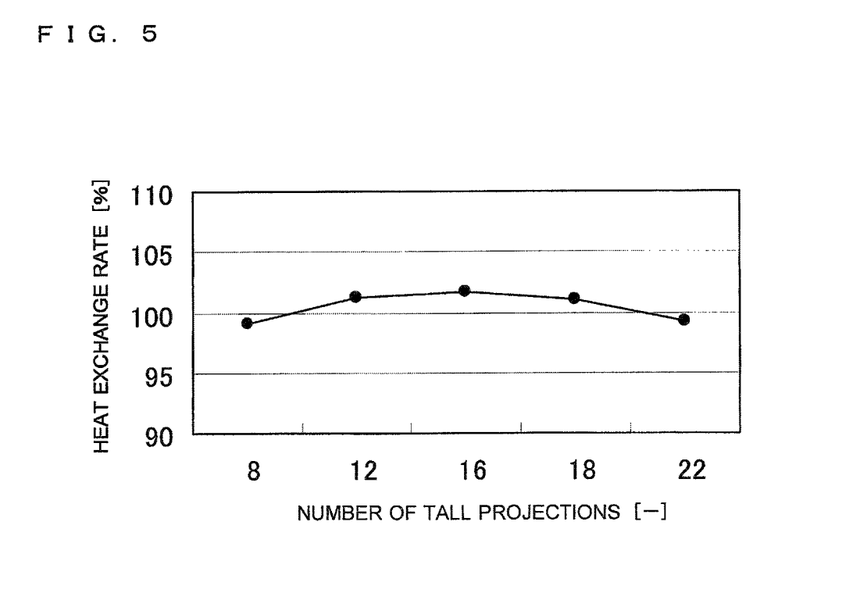
FIG. 5 is a graph showing the relationship between the number of tall projections included in a heat transfer pipe and heat exchange rate in a heat exchanger according to Embodiment 3.

FIG. 5 is a graph showing the relationship between the number of tall projections included in a heat transfer pipe and heat exchange rate in a heat exchanger according to Embodiment 3.

As is clear from FIG. 5, when the number of tall projections 22A is in the range of 12 to 18, the heat exchange rate exceeds 100%. When the number of tall projections 22A is in the range of 13 to 17, the heat exchange rate is further increased. In this case, the number of short projections 22B between the tall projections 22A is in the range of 2 to 4.

The reason why the number of tall projections 22A of the heat transfer pipe 20 is set in the range of 12 to 18 is because when the heat transfer pipe 20 is expanded, the pipe-expanding ball 30 contacts the tall projections 22A, so that the tip portions are depressed by 0.06 mm and flattened and the height H of the tall projections 22A is reduced. In other words, the short projections 22B, which are provided between the tall projections 22A, are not depressed, and only the tip portions of the tall projections 22A are depressed by 0.06 mm. In this case, the ratio W2/W1 of the width W2 of the tip portion to the width W1 of the base portion after the expansion of the heat transfer pipe 20 is in the range of 1.15 to 1.92, and the width W2 of the tip portion of each tall projection 22A after the expansion of the heat transfer pipe 20 is in the range of 0.28 mm to 0.46 mm.

When the number of tall projections 22A of the heat transfer pipe 20 is smaller than 12, the tip portions of the short projections 22B are also depressed and flattened, and the heat transfer performance in the pipe is reduced. When the number of tall projections 22A is more than 18, the number of short projections 22B is reduced, and the heat transfer performance in the pipe is reduced.

As described above, the heat transfer performance of the heat transfer pipe 20 can be increased by setting the number of tall projections 22A of the heat transfer pipe 20 in the range of 12 to 18.

Although the number of tall projections 22A included in the heat transfer pipe 20 is in the range of 12 to 18 in Embodiment 3, this differs in accordance with the outer diameter of the heat transfer pipe 20, and is not limited.

Embodiment 4

In Embodiment 4, the height h of the short projections 22B provided on the inner surface of the heat transfer pipe 20 is in the range of, for example, 0.1 mm to 0.3 mm.

Figure 6:
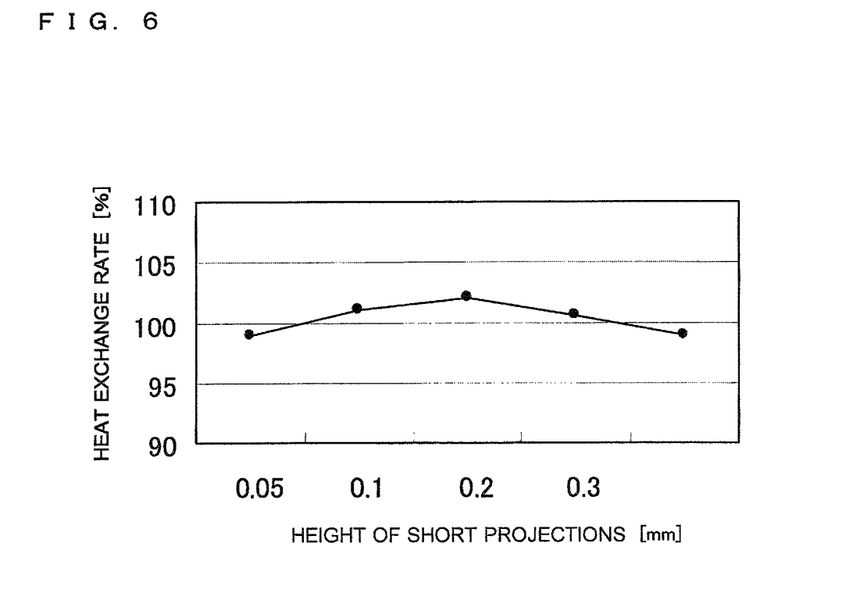
FIG. 6 is a graph showing the relationship between the height of the short projections after the expansion of a heat transfer pipe and heat exchange rate in a heat exchanger according to Embodiment 4.

FIG. 6 is a graph showing the relationship between the height of the short projections after the expansion of the heat transfer pipe and heat exchange rate in a heat exchanger according to Embodiment 4.

As is clear from FIG. 6, when the height h of the short projections 22B after the expansion of the heat transfer pipe 20 is in the range of 0.1 mm to 0.3 mm, the heat transfer rate increases as, for example, the surface area in the pipe increases, and the heat exchange rate exceeds 100%. In addition, when the height h of the short projections 22B is in the range of 0.1 mm to 0.3 mm, the apex angle α, which is the crossing angle between both side surfaces of each short projection 22B, is in the range of 5 degrees to 15 degrees. When the above-described range of the height h of the short projections 22B is narrowed to 0.15 mm to 0.25 mm, the heat exchange rate is further increased.

When the height h of the short projections 22B is greater than 0.3 mm, the amount of increase in the pressure loss exceeds the amount of increase in the heat transfer rate, and therefore the heat exchange rate is reduced. When the height h of the short projections 22B is smaller than 0.1 mm, the heat transfer rate is not increased.

As described above, the short projections 22B are formed so that the height h of the short projections 22B after the expansion of the heat transfer pipe 20 is in the range of 0.1 mm to 0.3 mm. Accordingly, the heat transfer performance of the heat transfer pipe 20 can be increased without increasing the pressure loss.

Although the height h of the short projections 22B included in the heat transfer pipe 20 is in the range of 0.1 mm to 0.3 mm in Embodiment 4, this differs in accordance with the outer diameter of the heat transfer pipe 20, and is not limited.

Embodiment 5

Figure 7:
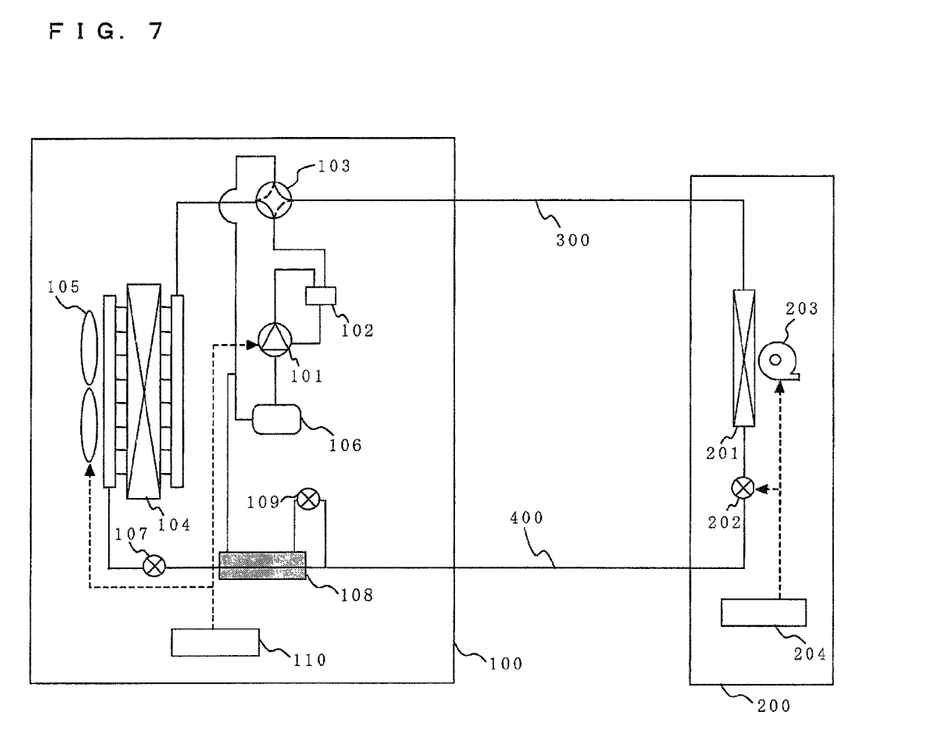
FIG. 7 is a refrigerant circuit diagram of an air conditioning device according to Embodiment 5.

FIG. 7 is a refrigerant circuit diagram of an air conditioning device according to Embodiment 5.

The air conditioning device according to Embodiment 5 includes a refrigeration cycle device including any one of the above-described heat exchangers according to Embodiments 1 to 4. The air conditioning device is constituted by an outdoor unit 100, which is a heat-source-side unit, and an indoor unit 200, which is a load-side unit and which is connected to the outdoor unit 100 with refrigerant pipes 300 and 400. One of the refrigerant pipes 300 and 400 through which refrigerant in the gas state (gas refrigerant) flows is referred to as a gas pipe 300, and the other pipe through which refrigerant in the liquid state (liquid refrigerant or two-phase gas-liquid refrigerant) flows is referred to as a liquid pipe 400. Here, R32 is used as the refrigerant. Since the aluminum material has a low strength, the plate thickness at the bottom of grooves in the heat transfer pipe is increased. Therefore, the pressure loss in the heat transfer pipe is increased. When R32, which causes a small pressure loss in the pipe, is used as the refrigerant, the evaporation heat transfer performance in the pipe can be increased without increasing the pressure loss. Therefore, a high-efficiency heat exchanger can be provided.

The outdoor unit 100 includes a compressor 101, an oil separator 102, a four-way valve 103, an outdoor heat exchanger 104, an outdoor blower fan 105, an accumulator 106, a throttle device (expansion valve) 107, a refrigerant heat exchanger 108, a bypass throttle device 109, and an outdoor control device 110.

The compressor 101 sucks the refrigerant from the accumulator 106, compresses the refrigerant into high-temperature, high-pressure gas refrigerant, and guides the refrigerant to a refrigerant pipe. With regard to operation control of the compressor 101, the compressor 101 is equipped with, for example, an inverter circuit, and the operation frequency is arbitrarily changed so that the capacity (amount of refrigerant that can be discharged per unit time) of the compressor 101 can be finely changed.

The oil separator 102 separates lubricant, which is mixed with the refrigerant discharged from the compressor 101, from the refrigerant. The separated lubricant is returned to the compressor 101. The four-way valve 103 switches the flow of the refrigerant on the basis of an instruction from the outdoor control device 110, thereby switching the operation between cooling and heating. The heat exchanger 1 described above in Embodiments 1 to 4 is used as the outdoor heat exchanger 104. The outdoor heat exchanger 104 causes the refrigerant to exchange heat with air (outside air).

The outdoor heat exchanger 104 functions as an evaporator during a heating operation and causes low-pressure refrigerant that flows thereinto through the throttle device 107 to exchange heat with the air, thereby evaporating and gasifying the refrigerant. The outdoor heat exchanger 104 functions as a condenser during a cooling operation and causes the high-temperature high-pressure gas refrigerant that flows thereinto from the compressor 101 through the four-way valve 103 to exchange heat with the air, thereby condensing and liquefying the refrigerant.

The outdoor blower fan 105 is provided to increase the efficiency of heat exchange with the refrigerant in the outdoor heat exchanger 104. The outdoor blower fan 105 may be operated by using an inverter circuit (not shown) with which the operation frequency of a fan motor can be arbitrarily changed to finely control the rotation speed of the fan.

The refrigerant heat exchanger 108 causes the refrigerant that flows through a main flow channel of the refrigerant circuit to exchange heat with refrigerant that flows through a channel that branches from the main flow channel and whose flow rate is adjusted by the bypass throttle device 109 (expansion valve). In particular, when supercooling of the refrigerant is required in the cooling operation, the refrigerant is supercooled and supplied to the indoor unit 200 by the refrigerant heat exchanger 108. The heat exchanger 1 described above in Embodiments 1 to 4 is also used as the refrigerant heat exchanger 108.

The liquid that flows through the bypass throttle device 109 is returned to the accumulator 106 through a bypass pipe 107. The accumulator 106 is, for example, means for accumulating excess liquid refrigerant. The outdoor control device 110 includes, for example, a microcomputer, and is capable of communicating with an indoor control device 204 through wired or wireless communication. The outdoor control device 110 performs, for example, operation control of the entire air conditioning device, such as the operation frequency control of the compressor 101 based on the control of the inverter circuit, by controlling each means related to the air conditioning device on the basis of data regarding detection performed by various detection means (sensors) disposed in the air conditioning device.

The indoor unit 200 includes an indoor heat exchanger 201, a throttle device (expansion valve) 202, an indoor blower fan 203, and the indoor control device 204. The heat exchanger 1 described above in Embodiments 1 to 4 is also used as the indoor heat exchanger 201. The indoor heat exchanger 201 causes refrigerant to exchange heat with the air in the space subjected to air conditioning.

The indoor heat exchanger 201 functions as a condenser during the heating operation and causes the refrigerant that flows thereinto through the gas pipe 300 to exchange heat with air. Thus, the refrigerant is condensed and liquefied (or converted into two-phase gas-liquid refrigerant), and is discharged toward the liquid pipe 400. The indoor heat exchanger 201 functions as an evaporator during the cooling operation and causes the refrigerant set to a low-pressure state by the throttle device 202 to exchange heat with air. Thus, the refrigerant is caused to absorb heat from the air so that the refrigerant is evaporated and gasified, and is discharged toward the gas pipe 300.

The indoor blower fan 203 is provided to adjust the flow of air subjected to the heat exchange, and the operation speed thereof is determined in accordance with, for example, settings made by a user. The throttle device 202 adjusts the pressure of the refrigerant in the indoor heat exchanger 201 by changing the opening degree thereof.

The indoor control device 204 includes, for example, a microcomputer, and communicates with the outdoor control device 110 through wired or wireless communication, as described above. The indoor control device 204 controls each device (means) of the indoor unit 200 so that, for example, the temperature of the room approaches a predetermined temperature in response to an instruction from the outdoor control device 110, that is, a remote control operation performed by, for example, a person in the room. The indoor control device 204 also transmits signals including data regarding detection performed by detection means disposed in the indoor unit 200 to the outdoor control device 110.

The operation of the air conditioning device will now be described. First, basic refrigerant circulation in the refrigerant circuit during the cooling operation will be described.

The high-temperature high-pressure gas refrigerant discharged from the compressor 101 as a result of the operation of the compressor 101 passes through the four-way valve 103 and the outdoor heat exchanger 104, so that the refrigerant is condensed into liquid refrigerant and discharged from the outdoor unit 100. The liquid refrigerant discharged from the outdoor unit 100 passes through the liquid pipe 400, enters the indoor unit 200, and is converted into low-temperature low-pressure liquid refrigerant whose pressure is adjusted through adjustment of the opening degree of the throttle device 202. The refrigerant passes through the indoor heat exchanger 201, so that the refrigerant is evaporated and discharged. The gas refrigerant passes through the gas pipe 300 and enters the outdoor unit 100. The gas refrigerant is sucked into the compressor 101 through the four-way valve 103 and the accumulator 106, and is heated again and converted into high-temperature, high-pressure refrigerant. Thus, the refrigerant is circulated.

Next, basic refrigerant circulation in the refrigerant circuit during the heating operation will be described.

The high-temperature high-pressure gas refrigerant discharged from the compressor 101 as a result of the operation of the compressor 101 passes through the four-way valve 103 and the gas pipe 300 and enters the indoor unit 200. In the indoor unit 200, the pressure of the refrigerant is adjusted through adjustment of the opening degree of the throttle device 202, and the refrigerant passes through the indoor heat exchanger 201 so that the refrigerant is condensed into liquid or two-phase gas-liquid refrigerant having an intermediate pressure. Then, the refrigerant is discharged from the indoor unit 200. The refrigerant discharged from the indoor unit 200 passes through the liquid pipe 400 and enters the outdoor unit 100. The pressure of the refrigerant is adjusted through adjustment of the opening degree of the throttle device 107, and the refrigerant passes through the outdoor heat exchanger 104 so that the refrigerant is evaporated into gas refrigerant. The gas refrigerant is sucked into the compressor 101 through the four-way valve 103 and the accumulator 106, and is compressed again into high-temperature high-pressure gas refrigerant, as described above. Thus, the refrigerant is circulated.

As described above, in Embodiment 5, the heat exchanger 1 according to Embodiments 1 to 4, which has a high heat exchange rate, is used as each of the outdoor heat exchanger 104 and the refrigerant heat exchanger 108 of the outdoor unit 100 and the indoor heat exchanger 201 of the indoor unit 200. Therefore, the coefficient of performance (COP) (energy consumption efficiency) can be increased and energy consumption can be reduced.

EXAMPLES

Examples of heat exchangers according to the present invention will now be described in comparison with comparative examples that differ from the heat exchangers according to the present invention.

In each table, W1 and W2 represent the widths of the tip portion and the base portion of each tall projection 22A, α represents the apex angle that is the crossing angle between both side surfaces of each short projection 22B, γ represents the apex angle that is the crossing angle between the opposed side surfaces of the tall and short projections 22A and 22B, and W2/W1 represents the ratio of the width W2 of the tip portion to the width W1 of the base portion. The figures in each table are values after the expansion of the heat transfer pipe 20.

Referring to Table 1, heat exchangers 1 were produced in which the width W1 of the base portion of each tall projection 22A formed on the inner surface of the heat transfer pipe 20 was 0.26 mm, the apex angle α of each short projection 22B was 15 degrees, and the apex angle γ was 2, 7, and 12 (Examples 1, 2, and 3). As comparative examples, heat exchangers were produced in which the width W1 of the base portion of each tall projection 22A was 0.26 mm, the apex angle α of each short projection 22B was 15 degrees, and the apex angle γ was 1 and 15 (Comparative Examples 1 and 2).

TABLE 1

| | Width W2 of Tip Portion (mm) | Width W1 of Base Portion (mm) | Apex Angle α (degrees) | Apex Angle γ (degrees) | Heat Exchange Rate (%) |
|---|---|---|---|---|---|
| Comparative Example 1 | 0.26 | 0.26 | 15 degrees | 1 | 99 |
| Example 1 | 0.28 | 0.26 | 15 degrees | 2 | 102.5 |
| Example 2 | 0.36 | 0.26 | 15 degrees | 7 | 103.5 |
| Example 3 | 0.46 | 0.26 | 15 degrees | 12 | 102 |
| Comparative Example 2 | 0.50 | 0.26 | 15 degrees | 15 | 97 |

As is clear from Table 1, the heat exchangers 1 according to Examples 1, 2, and 3 had heat exchange rates higher than those of the heat exchangers according to Comparative Examples 1 and 2 and higher than 100%, and the heat transfer performance in the pipe was improved.

Next, referring to Table 2, heat exchangers 1 were produced in which the apex angle α of each short projection 22B was 10 degrees and the ratio W2/W1 of the width W2 of the tip portion to the width W1 of the base portion of each tall projection 22A was 1.15 and 1.92 (Examples 4 and 5). As comparative examples, heat exchangers were produced in which the apex angle α of each short projection 22B was 10 degrees and the ratio W2/W1 of the width W2 of the tip portion to the width W1 of the base portion of each tall projection 22A was 1.0 and 2.0 (Comparative Examples 3 and 4).

TABLE 2

| | Width W2 of Tip Portion (mm) | W2/W1 (—) | Apex Angle α (degrees) | Heat Exchange Rate (%) |
|---|---|---|---|---|
| Comparative Example 3 | 0.2 | 1 | 10 degrees | 99 |
| Example 4 | 0.28 | 1.15 | 10 degrees | 101.3 |
| Example 5 | 0.46 | 1.92 | 10 degrees | 101 |
| Comparative Example 4 | 0.50 | 2.0 | 10 degrees | 99.2 |

As is clear from Table 2, the heat exchangers 1 according to Examples 4 and 5 had heat exchange rates higher than those of the heat exchangers according to Comparative Examples 3 and 4 and higher than 100%, and the heat transfer performance in the pipe was improved.

Next, referring to Table 3, heat exchangers 1 were produced in which the width W2 of the tip portion and the width W1 of the base portion in each tall projection 22A were 0.28 mm and 0.26 mm, respectively, and the apex angle α of each short projection 22B was 5 degrees, 10 degrees, and 15 degrees (Examples 6, 7, and 8). As comparative examples, heat exchangers were produced in which the width W2 of the tip portion and the width W1 of the base portion in each tall projection 22A were 0.28 mm and 0.26 mm, respectively, and the apex angle α of each short projection 22B was 0 degrees and 20 degrees (Comparative Examples 5 and 6).

TABLE 3

| | Width W2 of Tip Portion (mm) | Width W1 of Base Portion (mm) | Apex Angle α (degrees) | Heat Exchange Rate (%) |
|---|---|---|---|---|
| Comparative Example 5 | 0.28 | 0.26 | 0 degrees | 99 |
| Example 6 | 0.28 | 0.26 | 5 degrees | 102.1 |
| Example 7 | 0.28 | 0.26 | 10 degrees | 103.2 |
| Example 8 | 0.28 | 0.26 | 15 degrees | 102 |
| Comparative Example 6 | 0.28 | 0.26 | 20 degrees | 98 |

As is clear from Table 3, the heat exchangers 1 according to Examples 6, 7, and 8 had heat exchange rates higher than those of the heat exchangers according to Comparative Examples 5 and 6 and higher than 100%, and the heat transfer performance in the pipe was improved.

Next, referring to Table 4, heat exchangers 1 were produced in which the width W2 of the tip portion and the width W1 of the base portion in each tall projection 22A were 0.28 mm and 0.26 mm, respectively, the apex angle α of each short projection 22B was 15 degrees, and the number of tall projections 22A was 12, 16, and 18 (Examples 9, 10, and 11). As comparative examples, heat exchangers were produced in which the width W2 of the tip portion and the width W1 of the base portion in each tall projection 22A were 0.28 mm and 0.26 mm, respectively, the apex angle α of each short projection 22B was 15 degrees, and the number of tall projections 22A was 8 and 22 (Comparative Examples 7 and 8).

TABLE 4

|  | Width W2 of Tip Portion (mm) | Width W1 of Base Portion (mm) | Apex Angle α (degrees) | Number of Tall Projections (—) | Heat Exchange Rate (%) |
|---|---|---|---|---|---|
| Comparative Example 7 | 0.28 | 0.26 | 15 degrees | 8 | 99.1 |
| Example 9 | 0.28 | 0.26 | 15 degrees | 12 | 101.2 |
| Example 10 | 0.28 | 0.26 | 15 degrees | 16 | 101.8 |
| Example 11 | 0.28 | 0.26 | 15 degrees | 18 | 101 |
| Comparative Example 8 | 0.28 | 0.26 | 15 degrees | 22 | 99.2 |

As is clear from Table 4, the heat exchangers 1 according to Examples 9, 10, and 11 had heat exchange rates higher than those of the heat exchangers according to Comparative Examples 7 and 8 and higher than 100%, and the heat transfer performance in the pipe was improved.

Next, referring to Table 5, heat exchangers 1 were produced in which the width W2 of the tip portion and the width W1 of the base portion in each tall projection 22A were 0.28 mm and 0.26 mm, respectively, the apex angle α of each short projection 22B was 15 degrees, and the height h of the short projections 22B was 0.1 mm, 0.2 mm, and 0.3 mm (Examples 12, 13, and 14). As comparative examples, heat exchangers were produced in which the width W2 of the tip portion and the width W1 of the base portion in each tall projection 22A were 0.28 mm and 0.26 mm, respectively, the apex angle α of each short projection 22B was 15 degrees, and the height h of the short projections 22B was 0.05 mm and 0.4 mm (Comparative Examples 9 and 10).

TABLE 5

|  | Width W2 of Tip Portion (mm) | Width W1 of Base Portion (mm) | Apex Angle α (degrees) | Height of Short Projections (mm) | Heat Exchange Rate (%) |
|---|---|---|---|---|---|
| Comparative Example 9 | 0.28 | 0.26 | 15 degrees | 0.05 | 99 |
| Example 12 | 0.28 | 0.26 | 15 degrees | 0.1 | 101 |
| Example 13 | 0.28 | 0.26 | 15 degrees | 0.2 | 102 |
| Example 14 | 0.28 | 0.26 | 15 degrees | 0.3 | 100.5 |
| Comparative Example 10 | 0.28 | 0.26 | 15 degrees | 0.4 | 99 |

As is clear from Table 5, the heat exchangers 1 according to Examples 12, 13, and 14 had heat exchange rates higher than those of the heat exchangers according to Comparative Examples 9 and 10 and higher than 100%, and the heat transfer performance in the pipe was improved.

INDUSTRIAL APPLICABILITY

In the above-described Embodiment 5, heat exchangers according to the present invention are applied to an air conditioning device. The present invention is not limited to these devices, and may also be applied to other refrigeration cycle devices, such as refrigerating devices and heat pump devices, which form a refrigerant circuit and include a heat exchanger that serves as an evaporator and/or a condenser.

The invention claimed is:

1. A heat exchanger comprising:
   fins that are arranged in a direction orthogonal to a direction in which air flows; and
   a radially expanded heat transfer pipe that includes an inner surface and an outer surface, and that extends through, and is fixed to, the fins, wherein
   the inner surface of the radially expanded heat transfer pipe includes first projections arranged in a circumferential direction and extending in an axial direction of the radially expanded heat transfer pipe, and second projections arranged between the first projections,
   a height of the first projections is greater than or equal to a height of the second projections, each of the first projections comprising a trapezoidal projection in which a width of a tip portion is greater than a width of a base portion,
   each second projection is tapered such that a distance between both side surfaces thereof decreases from a base portion toward a tip portion thereof,
   opposed side surfaces of the first and second projections are so inclined that when extensions are drawn from the side surfaces, the extensions cross each other in an inner region of the radially expanded heat transfer pipe,
   a crossing angle between the extensions of the opposed side surfaces of the first and second projections in the radially expanded heat transfer pipe is in an angular range of 2 degrees to 12 degrees, and
   a crossing angle between both side surfaces of each second projection is in a range of 5 degrees to 15 degrees in the radially expanded heat transfer pipe.

2. The heat exchanger of claim 1, wherein the crossing angle between both side surfaces of each second projection in the radially expanded heat transfer pipe is such that the crossing angle between the opposed side surfaces of the first and second projections is in the angular range.

3. The heat exchanger of claim 1, wherein a ratio between the width of the tip portion of each first projection and the width of the base portion of the first projection is such that the crossing angle between the opposed side surfaces of the first and second projections is in the angular range in the radially expanded heat transfer pipe.

4. The heat exchanger of claim 1, wherein the number of first projections is set so that at least the second projections are not squashed in the radially expanded heat transfer pipe.

5. The heat exchanger of claim 1, wherein the height of the second projections is such that the crossing angle between the opposed side surfaces of the first and second projections is in the angular range in the radially expanded heat transfer pipe.

6. The heat exchanger of claim 1, wherein the width of the tip portion of each first projection is in a range of 0.28 mm to 0.46 mm in the radially expanded heat transfer pipe.

7. The heat exchanger of claim 1, wherein a ratio between the width of the tip portion of each first projection and the width of the base portion of the first projection is in a range of 1.15 to 1.92 in the radially expanded heat transfer pipe.

8. The heat exchanger of claim 1, wherein the number of first projections is in a range of 12 to 18, and the number of second projections between directly adjacent first projections is in a range of 2 to 4.

9. The heat exchanger of claim 1, wherein the height of the second projections is in a range of 0.1 mm to 0.3 mm in the radially expanded heat transfer pipe.

10. A refrigeration cycle device in which R32 is used as a refrigerant and which comprises at least a compressor, an outdoor heat exchanger, and an indoor heat exchanger, wherein the heat exchanger of claim 1 is used as each of the outdoor and indoor heat exchangers or one of the outdoor and indoor heat exchangers.

11. The heat exchanger of claim 1, wherein the heat transfer pipe is formed of an aluminum material.

12. The heat exchanger of claim 2, wherein a ratio between the width of the tip portion of each first projection and the width of the base portion of the first projection is such that the crossing angle between the opposed side surfaces of the first and second projections is in the angular range in the radially expanded heat transfer pipe.

13. The heat exchanger of claim 1, wherein the number of first projections is set so that at least the second projections are not squashed in the radially expanded heat transfer pipe.

14. The heat exchanger of claim 2, wherein the height of the second projections is such that the crossing angle between the opposed side surfaces of the first and second projections is in the angular range in the radially expanded heat transfer pipe.

15. The heat exchanger of claim 3, wherein the height of the second projections is such that the crossing angle between the opposed side surfaces of the first and second projections is in the angular range in the radially expanded heat transfer pipe.

16. The heat exchanger of claim 4, wherein the height of the second projections is such that the crossing angle between the opposed side surfaces of the first and second projections is in the angular range in the radially expanded heat transfer pipe.

* * * * *

UNITED STATES PATENT AND TRADEMARK OFFICE
CERTIFICATE OF CORRECTION

PATENT NO. : 9,879,921 B2
APPLICATION NO. : 14/241479
DATED : January 30, 2018
INVENTOR(S) : Lee et al.

It is certified that error appears in the above-identified patent and that said Letters Patent is hereby corrected as shown below:

On the Title Page

<u>Item (73)</u>
Assignee should read:
-- MITSUBISHI ELECTRIC CORPORATION, Tokyo, Japan Signed and Sealed this
Third Day of April, 2018

Andrei Iancu
*Director of the United States Patent and Trademark Office*